No. 663,417. Patented Dec. 11, 1900.
G. W. CLAYTON.
SHEEP DIPPING APPARATUS.
(Application filed Aug. 27, 1900.)
(No Model.) 3 Sheets—Sheet 3.
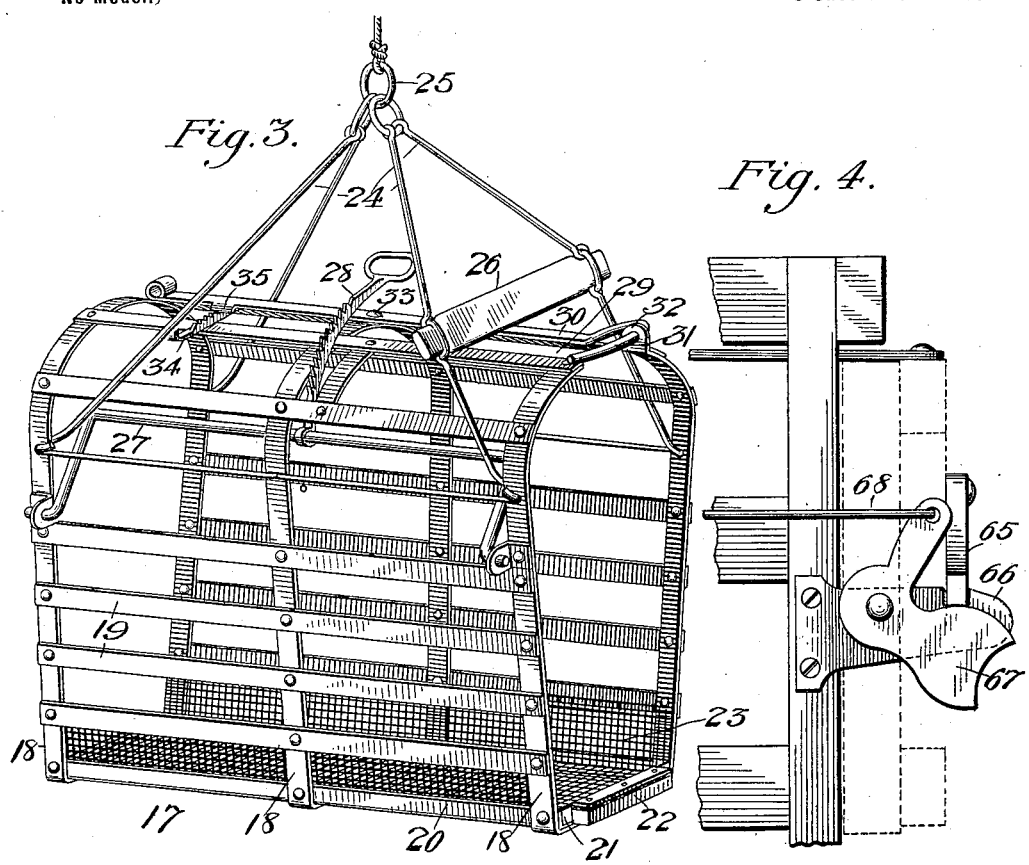
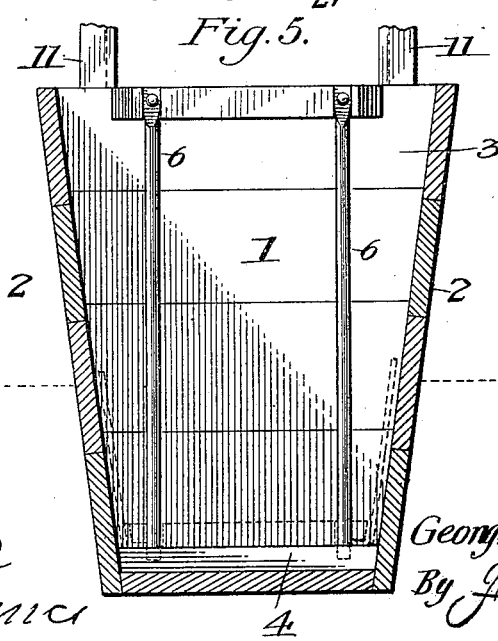
Witnesses,
D. V. Bell
J. C. Spencer
Inventor
George W. Clayton.
By F. E. Stebbins
atty.

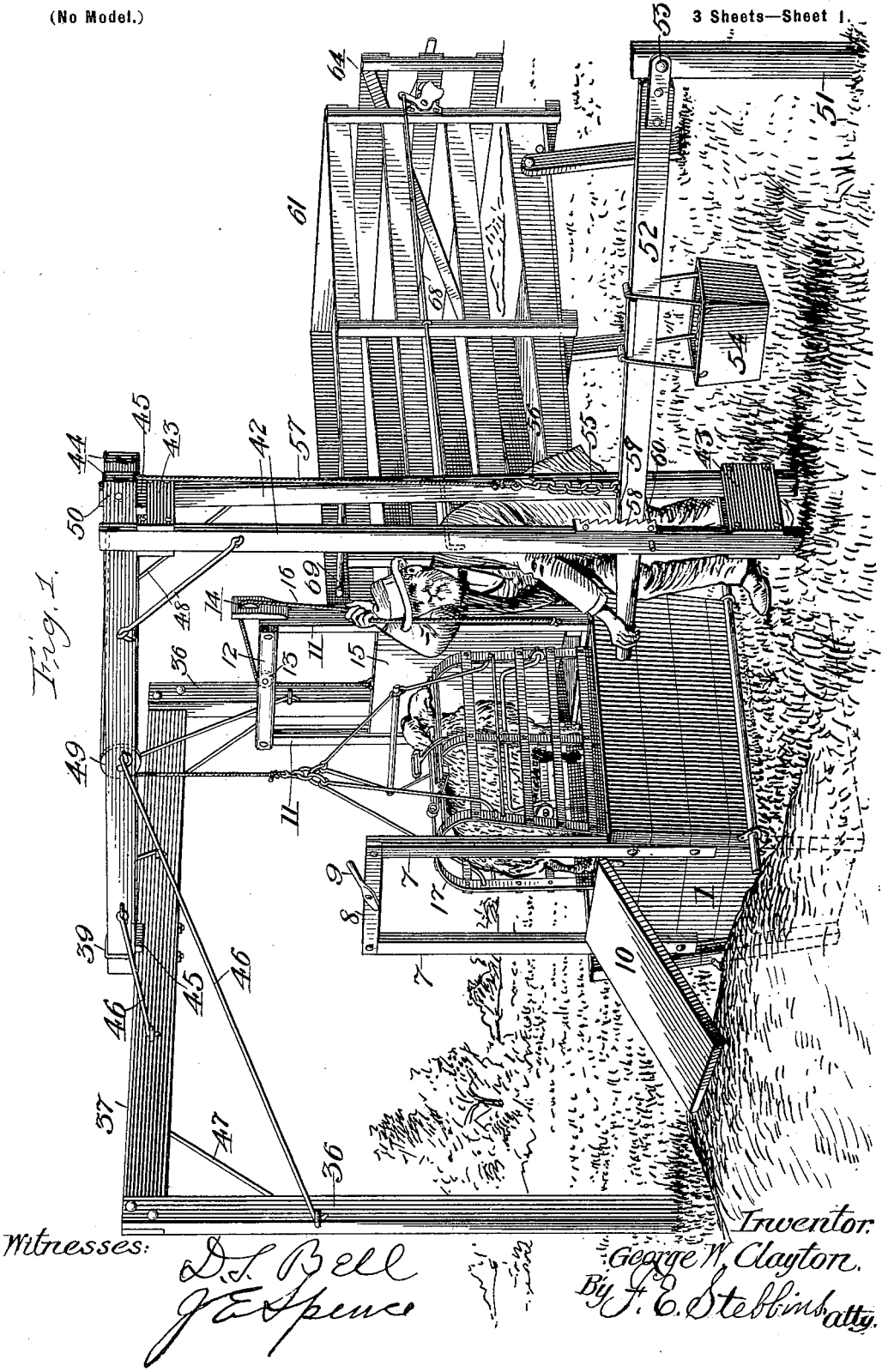

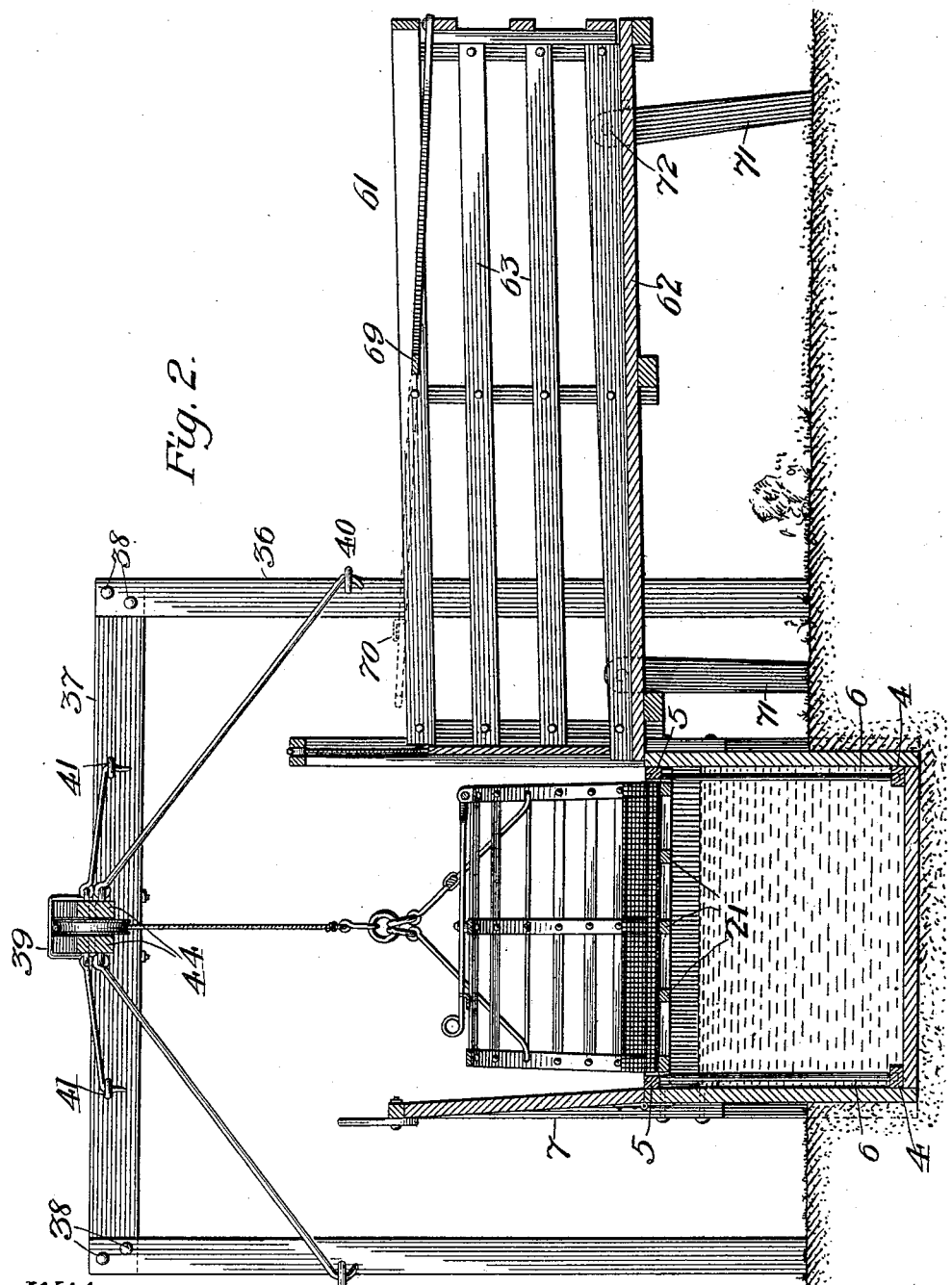

UNITED STATES PATENT OFFICE.

GEORGE W. CLAYTON, OF LEBANON, IOWA.

SHEEP-DIPPING APPARATUS.

SPECIFICATION forming part of Letters Patent No. 663,417, dated December 11, 1900.

Application filed August 27, 1900. Serial No. 28,171. (No model.)

*To all whom it may concern:*

Be it known that I, GEORGE W. CLAYTON, a citizen of the United States, residing at Lebanon, in the county of Van Buren and State of Iowa, have invented a certain new and useful Sheep-Dipping Apparatus, of which the following is a specification.

The object of my invention is the production of an apparatus which shall be adapted for use in immersing sheep or other animals in a prepared liquid solution for the purpose of preventing and curing parasitical and other diseases, the said apparatus to be so designed that it can easily and quickly be set up, operated, and taken down and transported, which shall be simple in construction, comparatively cheap in first cost, and made of common materials, and which, moreover, shall obviate the necessity of using the hands to place the animal in a tank or vat containing the solution and to remove it therefrom.

With this end in view my invention consists in certain novelties in construction and combinations and arrangements of parts hereinafter described.

The accompanying drawings illustrate one example of the complete apparatus, which is constructed according to the best mode or method I have so far devised for the application of the principle.

Figure 1 is a perspective view of the complete apparatus, showing a sheep in the cage ready to be lowered into the tank or vat containing the prepared solution. Fig. 2 is a longitudinal section of Fig. 1, taken in a perpendicular plane passing through the dripping-platform, the tank, and the cage. Fig. 3 is a perspective view of the cage. Fig. 4 illustrates the platform-gate and latch-unlocking mechanism. Fig. 5 is a cross-section of the tank or vat.

My apparatus comprises four main parts—a tank or vat, a dipping-cage, lowering and raising mechanism, and a dripping-platform.

Referring to the several figures, the numeral 1 designates the tank or vat.

2 2 are the oblique sides of the tank; 3 3, the ends thereof; 4 4, cleats at the bottom of the tank, on the inside; 5 5, cleats or bars near the top edge of the tank at each end thereof; 6 6, guide rods or bars secured to the cleats and located some distance from the ends of the tank; 7 7, posts secured to one end of the tank.

8 is a cross-bar; 9, a button; 10, a door hinged to the edge of the tank.

11 11 are two grooved posts at the opposite end of the tank.

12 is a cross-bar; 13, a sheave or pulley; 14, a second pulley journaled in a support secured to one of the posts; 15, a sliding door movable in grooves formed on the inner sides of the posts, and 16 is a rope secured at one end to the sliding door and passed over the two pulleys.

I make the tank with tapering sides, so that the space at the bottom will be as small as practical, to the end that the required depth of the dipping liquid may be secured with the minimum quantity of the solution. The height of the tank should be approximately three feet, and it should be sunk in the ground about sixteen inches. On the sides of the tank I place hooks which are to receive rods by which the tank may be easily raised and transported by hand.

The numeral 17 designates the cage, which is preferably made, in part at least, of metal, which will aid in submerging a sheep.

18 designates end and central bars of strap metal bent to shape.

19 designates longitudinal strips of metal spaced apart and riveted or bolted to the bars.

20 designates angle irons or bars secured to the bars 18 by rivets.

21 designates wooden or other strips secured to the angle-bars and forming the bottom frame of the cage.

22 designates projecting parts at the ends of the cage which fit between the guide-rods 6 6 at each end of the tank and which hold the cage in its proper upright position out of contact with the sides of the tank and still allow it to rock slightly.

23 is a piece of wire-netting secured to the wooden strips and forming a perforated floor or bottom for the cage.

24 designates supporting rods or wires pivoted or otherwise secured to the top of the cage at each end thereof and on both sides; 25, a ring to which the upper ends of the rods or wires are united; 26, a spacing-bar which prevents the contraction of the end of the cage at the top where the sheep's head is located; 27, a bent rod pivoted to the cage on the inside, as shown, and which can be lowered against the side of a sheep to prevent it turning within the cage; 28, a ratchet-bar pivoted to the rod 27 and adapted to engage the edge of a strip 19 and hold the bent rod in position when lowered against the side of an animal; 29, an open space at the upper end of the cage for a sheep's neck, the head of the animal projecting above the top of the cage; 30, a bar for holding the neck within the opening; 31, a hook or curved portion of the rod at one end; 32, a perforated guide for the hook or curved end; 33, a pivot for the bar; 34, a toothed bar on the cage, and 35 is a lip upon the bar 30 which engages the tooth-bar, and thereby prevents the rotation of the former about its pivot.

I preferably make the cage tapering from the top toward the bottom, so it will correspond in shape with the tapering sides of the tank. As shown by the drawings, the length of the cage at the top may be slightly less than the length of the same at the bottom, in order that the cage may move freely within the tank when being lowered and raised and not engage the ends. The projecting ends or parts 22 at the bottom of the cage guide the same in its downwardly and upwardly movements, and the cleats or bars 5 5 on the top edges of the tank limit the upward movement of the cage to the level of the top of the tank.

The numeral 36 designates two posts of the lowering and raising mechanism.

37 is a cross-beam; 38, bolts which unite the ends of the posts and the cross-beam.

39 is a U-bolt.

40 designates staples secured to the posts; 41, staples secured to the cross-beam.

42 designates two parallel posts or uprights; 43, cleats near the ends rigidly uniting the parallel posts.

44 designates two parallel horizontal bars or beams resting at their ends upon the cross-beam 37 and the top cleats 43 on the parallel posts and with one end clamped by the U-bolt 39 on the cross-bar.

45 designates cleats secured to the horizontal bars 44 and so located that they will prevent the longitudinal movement of the said horizontal bars. (Shown in Fig. 1 of the drawings.)

46 designates hooked brace-rods detachably uniting the bars 44 and the posts 36 and cross-beam 37, which latter is also braced by similar rods 47. (Shown in Fig. 1 of the drawings.)

48 designates hooked brace-rods uniting the parallel posts 42 and the horizontal bars.

49 is a sheave or pulley located between the horizontal bars and directly over the tank; 50, a sheave at the end of the horizontal bars; 51, a post set or driven in the ground; 52, a lever; 53, a pivot-pin; 54, an adjustable balancing-weight located on the lever; 55, a chain; 56, a hook; 57, a rope with hook secured to the cage and passing over the sheaves; 58, a rack; 59, a plate upon the lever adapted to engage the rack, and 60 is a rod which limits the downward movement of the lever.

The posts of the lowering and raising mechanism rest upon the ground and the parts are detachably secured together, as indicated, so that they can readily be taken apart, transported in a vehicle or otherwise, and again be set up for operation or use.

The numeral 61 designates the dripping-platform, which may be made of any desirable size and shape; 62, the floor of the platform; 63, the sides; 64, a hinged gate at one end of the platform; 65, a latch on the gate; 66, a catch on one of the sides; 67, a pivoted unlocking device which is adapted to raise the latch from the catch when the device is rotated; 68, a rod or wire engaging the unlocking device, supported on the platform side and extending so as to be within easy reach of the operator; 69, a bar or rod pivoted to the gate for opening and closing the same and which is also within easy reach of the operator; 70, a guide on the side of the platform for the bar.

71 designates the folding legs of the platform; 72, the bolts by which the legs are pivoted to the sides of the platform.

It will be observed on reference to Figs. 1 and 2 that the floor of the platform slopes toward the tank and that the end of the platform laps over the edge of one end of the tank and occupies a position between the posts which guide the sliding door. This disposition insures the return to the tank of all the liquid which falls from the sheep upon the dripping-platform.

The method of using the apparatus will be readily understood from an inspection of the drawings. It is of course desirable to provide a guideway or chute at the end of the tank adjacent the hinged door to facilitate the introduction of the sheep to the cage. The door 10 being lowered, an animal is advanced into the cage. The lever 52 is next raised and the cage and animal allowed to drop by gravity into the solution until the entire body, with the exception of the head, is submerged. A reverse movement of the lever and balancing-weight thereon raises the cage to the level of the top edge of the tank, the cleats 5 5 at the ends of the rods limiting the upward movement of the cage. Finally, the door 15 is raised and the sheep allowed to pass from the cage to the dripping-platform or allowed to go free.

It is obvious from the foregoing description that I have produced a dipping apparatus which fulfils all the conditions set forth as the purpose or end of my invention.

While I have shown only one example of the complete apparatus, I do not thereby intend to confine the scope of my invention or claims to such example, inasmuch as many changes may be introduced, parts and elements and equivalents substituted for those shown, and various alterations and additions in construction be made without constituting a substantial departure.

What I claim as new, and desire to secure by Letters Patent, is—

1. The combination in a sheep-dipping apparatus, of a tank; a cage; lowering and raising mechanism; and an inclined dripping-platform; said tank, cage, lowering and raising mechanism, and dripping-platform being constructed each independent of the others; the lowering and raising mechanism adapted to be erected over the tank and cage and to lower and raise the cage; and the said dripping-platform having one end adapted to be removably supported upon the edge of the tank; whereby the said several parts constituting the entire apparatus can repeatedly be taken apart for transportation and again set up and assembled for use in different places.

2. The combination in a sheep-dipping apparatus, of a tank, a cage, lowering and raising mechanism, and a dripping-platform; said parts being constructed each independent of the other, and said dripping-platform being open at one end and having a gate at the other end, and likewise provided with a latch and latch-unlocking device and a rod or bar for operating the gate.

3. The combination in a sheep-dipping apparatus, of a tank, a cage, and lowering and raising mechanism for the cage; said parts being constructed each independent of the other; and said lowering and raising mechanism comprising posts, a supporting-beam carrying sheaves, a pivoted lever, a rope secured to the cage and lever and passed over the sheaves, and a counterbalancing-weight on the lever.

4. The combination in a sheep-dipping apparatus, of a tank, a cage, and lowering and raising mechanism; said parts being constructed each independent of the other; and said lowering and raising mechanism embodying posts, a cross-beam, and a supporting beam having sheaves, said parts being detachably united by brace-rods, a rope, and a pivoted lever supporting a balancing-weight.

5. The combination in a sheep-dipping apparatus, of a tank, a cage, and lowering and raising mechanism; said parts being constructed each independent of the other; and said tank having at one end two posts and a sliding door, and at the other end two posts and a hinged door which can be turned or swung down to serve as a gangway.

6. The combination in a sheep-dipping apparatus, of a tank, a cage, and lowering and raising mechanism; said parts being constructed each independent of the other; and said tank having guide rods or bars at each end on the inside and said cage having projections at the ends fitting between the rods.

7. The combination in a sheep-dipping apparatus, of a tank, a cage, and lowering and raising mechanism; said parts constructed each independent of the other; and said cage being made of bent metallic bars, bars spaced apart and secured to the bent bars, and also having a bottom of perforated material, and being open at each end.

8. The combination in a sheep-dipping apparatus, of a tank, a cage, and lowering and raising mechanism; said parts being constructed each independent of the other; and said cage being provided with an opening for the animal's head and with rods for supporting the same and two of said rods having a spacing-bar to prevent the contraction of the cage at the end.

9. The combination in a sheep-dipping apparatus, of a tank, a cage, and lowering and raising mechanism for the cage; said parts being constructed each independent of the other; and said tank being partly set in the ground and having a sliding door at one end with means for raising the same, and the lowering and raising mechanism, embracing a pivoted lever, said pivoted lever and the means for raising the sliding door being located adjacent each other whereby a single operator can manipulate both devices.

10. The combination in a sheep-dipping apparatus, of a tank having bars on the inside near the ends; a cage having projections at the ends; and lowering and raising mechanism; the projecting ends of the cage being adapted to engage the bars on the ends of the tank and limit its upward movement to a plane substantially parallel to the top edge of the tank.

11. The combination in a sheep-dipping apparatus, of a tank having a sliding door at one end and a hinged door at the other; a cage open at the ends and closed at the top and sides; and lowering and raising mechanism comprising a frame erected over the tank and cage and having sheaves, a pivoted lever supporting a balancing-weight, and a rope or chain passed over the sheaves and its ends secured to the cage and lever.

12. The combination in a sheep-dipping apparatus, of a tank; a cage; and lowering and raising mechanism; said tank having a hinged door at one end and a sliding door at the other end, said hinged door serving, when lowered, as a gangway; said cage being closed at the sides and top and open at the ends; and said lowering and raising mechanism constructed independent of the tank and embracing sheaves, a pivoted lever having a weight thereon, and a rope passing over the sheaves and secured to the lever and cage.

13. The combination in a sheep-dipping apparatus, of a tank; a cage; lowering and raising mechanism; and a dripping-platform constructed independent of the other parts; said tank having two posts secured to each end, a door hinged to the edge of the tank at one end and a sliding door movable between the posts at the opposite end operated by a rope passing over pulleys; the end of the dripping-platform fitting between the posts and resting upon the edge of the tank.

14. The combination in a sheep-dipping apparatus, of a tank, a cage supported above the tank; lowering and raising mechanism embracing sheaves, a weighted lever which counterbalances the cage, and a rope; and an independently-constructed dripping-platform having sides and folding legs whereby the said legs may be folded parallel with the platform when the apparatus is to be transported.

15. The combination with a sheep-dipping apparatus, of a dripping-platform having a closed bottom, upright sides secured to the said bottom, an open end and an end closed by a hinged gate; said platform being further provided with a latch, a latch-unlocking device, and a bar or rod for operating the gate; whereby the gate can be opened and closed by the operator when at the end of the platform opposite the gate.

16. The combination in a sheep-dipping apparatus, of a tank; a cage; and lowering and raising mechanism; said cage having a bottom provided with perforated material, bent metallic bars with their ends secured to the bottom, metallic bars parallel with the bottom, spaced apart and secured to the bent metallic bars, and rods for supporting the cage, the said metallic parts by their weight serving to force the sheep into the solution within the tank.

17. The combination in a sheep-dipping apparatus, of a tank; a cage; and lowering and raising mechanism comprising posts, an upright, and a supporting-beam united by hooked rods and staples, a rope, and a weighted lever, said upright having a ratchet-plate and said lever having a plate adapted to engage the ratchet-plate.

18. The combination in a sheep-dipping apparatus, of a tank; a cage; and lowering and raising mechanism; said cage having a pivoted rod or bar located on the inside of the cage which can be turned down against the side of an animal, and means for operating the bar and holding it in its lowered position.

19. The combination in a sheep-dipping apparatus, of a tank; a cage; and lowering and raising mechanism; said cage having an opening at one end and at the top for the neck of a sheep and a pivoted bar for confining the neck of the animal in the open space.

20. The combination in a sheep-dipping apparatus, of a tank; a cage; and lowering and raising mechanism; said cage being open at the ends and closed at the top with the exception of an open space near one end for the animal's neck, and provided with pivoted rods and rings to receive the rope of the lowering and raising mechanism.

In testimony whereof I affix my signature in presence of two witnesses.

GEORGE W. CLAYTON.

Witnesses:
D. F. BELL,
J. E. SPENCE.